United States Patent [19]

Te Velde

[11] 3,736,476

[45] May 29, 1973

[54] METHOD OF MANUFACTURING ELECTRONIC DEVICES

[75] Inventor: Ties Siebolt Te Velde, Emmasingel, Eindhoven, Netherlands

[73] Assignee: U.S. Philips Corporation, New York, N.Y.

[22] Filed: Oct. 21, 1971

[21] Appl. No.: 191,526

Related U.S. Application Data

[63] Continuation of Ser. No. 861,345, Sept. 26, 1969, abandoned.

[52] U.S. Cl. .............................317/234 R, 317/234 S

[51] Int. Cl. .............................H01l 5/00

[58] Field of Search .............................317/230, 235, 234

[56] References Cited

UNITED STATES PATENTS

| | | | |
|---|---|---|---|
| 3,538,395 | 11/1970 | Riley | 317/230 |
| 3,166,693 | 1/1965 | Haring et al. | 317/230 |

*Primary Examiner*—John W. Huckert
*Assistant Examiner*—E. Wojciechowicz
*Attorney*—Frank R. Trifari

[57] ABSTRACT

An electronic device comprising a layer of grains consisting of grains having a low-ohmic core and a high-ohmic enveloping layer which are embedded in a plastic foil, from which grain parts project on both sides, said projecting parts being contacted.

2 Claims, 4 Drawing Figures

INVENTOR.
TIES S. TE VELDE
BY

AGENT

METHOD OF MANUFACTURING ELECTRONIC DEVICES

This application is a continuation of Ser. No. 861,345 filed Sept. 26, 1969 now abandoned.

The invention relates to an electronic device which comprises a foil of insulating material in which grains of electronically active material are incorporated in such manner that said grains project freely from both surfaces of the foil, said foil being covered with one or more electrode layers which contact projecting parts of the grains.

The invention is distinguished from similar configurations which are known per se in that the grains consist of cores of a low-ohmic material with enveloping layers of a high-ohmic material, the cores and/or the enveloping layers contacting an electrode layer.

This choice for the structure of the grains has been made on the basis of the following considerations from which it appears that electronic devices with particularly valueable properties can be obtained with said structure.

Figure 1:
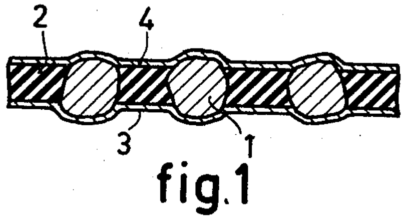

The invention will be explained in greater detail with reference to a few examples and the drawing, in which FIG. 1 is a diagrammatic cross-sectional view of a known structure of a foil comprising electronically active grains.

Figure 2:
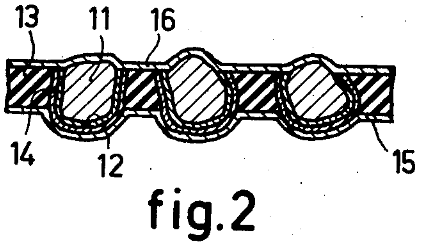
Figure 3:
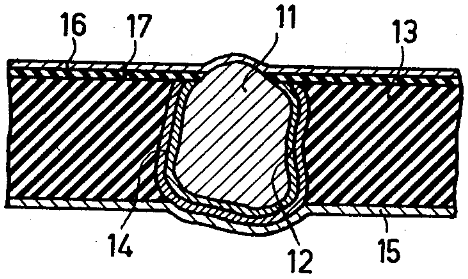
Figure 4:
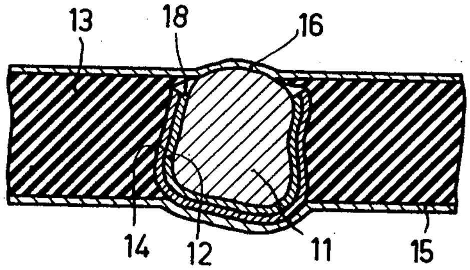

FIG. 2 is a diagrammatic cross-sectional view of a part of a device according to the invention, FIG. 3 is a diagrammatic cross-sectional view of a detail of the device shown in FIG. 2, FIG. 4 is a diagrammatic cross-sectional view of a detail of an other device according to the invention.

FIG. 1 of the drawing diagrammatically shows a known structure in which grains 1 consisting of a homogeneous material are incorporated in an insulating foil 2 and the parts of the grains projecting on both sides of the foil contact electrode layers 3 and 4.

The operation of these devices with respect to the geometry is determined by the grain thickness and by the comparatively small contact surface area which often occupies only 10 to 20 percent of the grain surface area.

By using grains according to the invention consisting of a low-ohmic core and a high-ohmic enveloping layer, the effective thickness is considerably reduced and the effective surface area increased, as compared with a structure with homogeneous grains, assuming that the cores which are connected together electrically are used as electrode, and that counter electrodes, which are also connected together are provided on the enveloping layers, thus using the said enveloping layers as the active parts of the grains.

This structure is diagrammatically shown in FIG. 2. The grains consisting of a low-ohmic core 11 surrounded by a high-ohmic enveloping layer 12 are incorporated in the plastic foil 13. Metal layers 14 which are connected together by the metal layer 15 are provided on the enveloping layers. On the other side of the foil the metal layer 14 and the high-ohmic layer 12 are locally removed from the grains. The exposed core surfaces are connected together by the contact or electrode layer 16.

In this manner it is possible, for example, if the layer 12 consists of a suitable dielectric to obtain capacitors of a very high capacity. The grains may advantageously consist of a semiconductor material, in which, for example, the core and the enveloping layers are of different conductivity types. In circumstances, however, it may be of importance that between the core and the enveloping layers of the grains no p-n-junction is formed, the capacity of which is voltage-dependent. For that purpose the material of the core and the enveloping layer must be of the same conductivity type. When the enveloping layer consists of a semiconductor substance having a negative temperature coefficient, NTC-resistors of a very low resistance can be obtained, or, if the semiconductor substance is photoconductive, effective photoconductors can be obtained.

In the structure shown in FIG. 2 it is of importance that a short-circuit between the cores 11 and the layers 12 is prevented on the side of the foil where the cores 11 are connected together by the contact layer 16. This can be achieved by providing an insulating layer 17, (see FIG. 3) after the layers 12 and the metal layers 14 have been locally removed by etching as is shown in FIG. 3, and then removing said insulation locally in such manner that only surface parts of the cores are exposed, and contacting said surface parts by means of the electrode layer 16.

However, according to a preferred method of preventing such shortcircuits (see FIG. 4) the etching is continued until a part of the material which is situated between the cores 11 and the foil 13 is removed to the level 18, so that contact of the layers 12 and 14 with the electrode layer 16 which connects the cores mutually is prevented.

The invention will now be described in greater detail with reference to a few examples.

EXAMPLE 1

Aluminum cores having an average diameter of 40 $\mu$m are subjected to a thermal treatment in an oxygen-containing gas atmosphere, as a result of which enveloping layers of aluminum oxide, thickness approximately 1 $\mu$m, are formed on the aluminum cores. On these enveloping layers a copper layer is provided by electroless deposition.

The grains are then spread on a substrate which is provided with an adhesive layer of rubber glue. The non-adhered grains are removed so that a layer of one grain thickness remains. The grains are then embedded in a polyurethane. After hardening of the polyurethane the resulting foil is removed from the substrate.

After dissolving the adhesive layer with xylene and etching the other foil surface with a 4 percent alcoholic lye solution, a foil is obtained in which the grains are incorporated in such manner as to project freely on both surfaces of the foil.

In order to obtain a capacitor in which the layers of aluminum oxide form the dielectric, contact layers are provided on the foil by vapor-depositing copper, which layers on one side of the foil, interconnect the copper layers which are provided on the aluminum oxide layers, and, on the other side of the foil, interconnect the aluminum cores.

For that purpose the surface of the cores must be locally exposed on this latter side of the foil.

As is known, the copper can be removed by means of a ferric chloride solution and the aluminum oxide can be removed by etching with a solution of 10 percent phosphoric acid and 5 percent sodium bichromate at 70° C. The aluminum cores themselves are not attached by said etching.

Etching is continued until a part of the enveloping layers of aluminum oxide and of copper situated between the cores and the foil is also removed. As a result of this, a short-circuit between the cores and copper layers by the electrode layer to vapor-deposited afterwards is prevented as was explained above with reference to FIG. 4 of the drawing.

In this manner, capacitors can be obtained having a capacity of more than 30,000 pF per sq.cm of foil surface area.

EXAMPLE 2

Cores having an average diameter of 40 $\mu$m and consisting of iron oxide ($Fe_2O_3$) with a few percent of titanium oxide are treated in a nitrogen atmosphere at 1000° C. As is known per se, a lowohmic product is formed consisting of $Fe_2O_3$ crystals, in which a part of the Fe-ions is replated by Ti-ions.

By cooling in air, a high-ohmic enveloping layer thickness approximately 1 $\mu$m is formed by oxidation on the grains, which layer shows a strongly negative temperature coefficient of the resistance.

A copper layer is then provided by electroless deposition on the high-ohmic enveloping layer of the grains and the grains are incorporated in a foil of polyurethane in the manner as described in example 1, in such manner as to project freely on both sides of the foil.

The low-ohmic cores of the grains are then exposed on one side by etching with 25 percent hydrochloric acid, etching being continued until a part of the high-ohmic enveloping layer and the metal layer situated thereon between the cores and the foil material is also removed, so as to prevent a shortcircuit by the electrode layers to be provided afterwards.

In this manner resistors having a high negative temperature coefficient and a low resistance value are obtained.

It will be obvious that the invention is not restricted to the example described, but that many variations are possible to those skilled in the art without departing from the scope of the invention. For example, the enveloping layer or layers may entirely surround the core, electrode layers on both sides of the foil contacting only the enveloping layer. This may be done in those cases where the core and/or the enveloping layer should be submitted only to alternating electric fields. In such a way, for instance in the case of Example 1, a series connection of two capacitors formed between the core and each of the electrode layers may be obtained.

The cores, the enveloping layers and the foil may be composed of materials different from those of the given examples. The high-ohmic enveloping layer may be composed of a plurality of layers one on top of the other, for instance layers of different oxides.

If desired, the layer of grains may be provided on a carrier. Moreover the layer of grains according to the invention may form part of a larger layer of grains, of which other parts have been composed in a different manner and fulfill other electronic functions.

What is claimed is:

1. An electronic device comprising a foil of an insulating material; grains of a semiconductor material incorporated in and in contact with said foil, each of said grains having a portion projecting from both surfaces of said foil and consisting of a core of a low ohmic material; a first and second layer of electrode material each covering an opposite side of said foil, said first layer of electrode material disposed in contacting relationship with projecting portions of said grains; a layer of a high ohmic material enveloping those portions of said grains out of contacting relationship with said first layer of electrode material; and a layer of metal substantially entirely covering said layer of a high ohmic material on one side thereof and contacting said second layer of electrode material on the other side thereof whereby the contact surface between said grains and said first and second electrode layers is relatively large while maintaining the easy to handle flexible sheet structure and large choice of dielectric material available to the monograin structure of said electronic device.

2. A device as claimed in claim 1 wherein said grains and said layer of high ohmic material each consist of semiconductor materials of the same conductivity types.

* * * * *